United States Patent [19]

King

[11] 4,277,787

[45] Jul. 7, 1981

[54] CHARGE TRANSFER DEVICE PHASED ARRAY BEAMSTEERING AND MULTIBEAM BEAMFORMER

[75] Inventor: Robert D. King, Clay, N.Y.

[73] Assignee: General Electric Company, Syracuse, N.Y.

[21] Appl. No.: 105,578

[22] Filed: Dec. 20, 1979

[51] Int. Cl.$^3$ ............................................... H04B 7/00

[52] U.S. Cl. ............................... 343/100 SA; 343/854

[58] Field of Search .......................... 343/100 SA, 854

[56] References Cited

U.S. PATENT DOCUMENTS

| | | | |
|---|---|---|---|
| 3,460,145 | 8/1969 | Johnson . | |
| 3,480,958 | 11/1969 | Tcheditch . | |
| 3,971,022 | 7/1976 | Lenz | 343/754 |
| 3,987,292 | 10/1976 | Means . | |
| 3,997,973 | 12/1976 | Buss | 33/70 T |
| 4,090,199 | 5/1978 | Archer | 343/100 SA |
| 4,112,430 | 9/1978 | Ladstatter | 343/100 R |
| 4,156,284 | 5/1979 | Engeler | 364/862 |
| 4,161,785 | 7/1979 | Gasparek | 364/827 |

*Primary Examiner*—Theodore M. Blum

*Attorney, Agent, or Firm*—Carl W. Baker; Richard V. Lang

[57] ABSTRACT

A phased array radar system is disclosed, capable of simultaneously transmitting beams in different directions as well as simultaneous multiple beam beamforming with both linear and planar arrays. The system employs charge transfer device complex matrix multipliers to generate the phase weights necessary to produce and steer one or more transmit beams, and applies these phase weights to control directly the phasing of distributed transmitters individual to the antenna elements of the array. Similar matrix multipliers are employed to generate the phase weights necessary for beamforming on receive.

8 Claims, 7 Drawing Figures

CHARGE TRANSFER DEVICE PHASED ARRAY BEAMSTEERING AND MULTIBEAM BEAMFORMER

BACKGROUND OF THE INVENTION

This invention relates to phased array radar systems and more particularly to radar systems of the type employing a plurality of antenna elements disposed in a linear, rectangular or other ordered array, so as to establish a narrowly directive sensitivity pattern in the desired direction of transmission or reception of electromagnetic wave energy. Still more particularly, this invention is directed to electronic scanning means for use with phased array antenna systems, enabling the forming and steering of one or a plurality of individual transmit and receive beams with good precision of control of beam direction and with a minimum of system and component complexity.

In prior art phased array radar systems the phase commands or control signals for adjusting the relative phases of the individual array elements as necessary to form and steer the beams formed by the array have been generated and applied to the antenna elements in many different ways. Perhaps most commonly, phase command signals have been generated in general purpose computers using algorithms or equations which are now well known in the art for computing the values of phase weightings necessary to achieve the desired array beam positions. Beam control in this manner may require the dedication of a fairly sizable data processor simply to compute and supply the proper phase commands, particularly if more than one beam is to be formed simultaneously, and systems of this kind accordingly tend to be somewhat complex and correspondingly costly to manufacture and maintain. Also, with digital systems it commonly is the practice to employ digital phase shifters and to quantize or round off the calculated phase commands to perhaps three or four bits, and unless the round-off errors thus introduced are carefully compensated the resultant accuracy may suffer accordingly.

Other proposals for more direct and simplified generation of the array element phase commands have involved use of electro-optical processors of various kinds, one such system, by way of example, being described and claimed in the copending application of Fitelson et al, Ser. No. 800,155, filed May 25, 1977, of common ownership herewith. Phase command generators have also been implemented in a variety of other circuit configurations such as disclosed, for example, in U.S. Pat. Nos. 3,450,145 to Johnson and 4,112,430 to Ladstatter, also of common ownership herewith.

The present invention is directed to electronically scanned arrays which are of the general kind described in these earlier patents, but which afford different or additional capabilities and advantages in areas of system performance, complexity and cost. To these ends, the array phase command generating system of the present invention utilizes charge transfer device (CTD) complex matrix multipliers such as disclosed in U.S. Pat. Nos. 4,156,284 to Engeler and 4,161,785 to Gasparek, both of common assignment with the present application, in a particularly cost-effective combination in which the array is capable of forming and steering either a single beam or a plurality of beams simultaneously with good accuracy and precision of control, and without limitation to specific angles in space, all with minimized complexity and cost of system implementation.

BRIEF SUMMARY OF THE INVENTION

In its preferred embodiment the invention comprises a plurality of dipoles or other suitable antenna elements arranged in an ordered array, as for example in a linear or planar array, with each antenna element being driven, or transmit, by a transmitter unit individual to the element and normally located contiguously with it. For beamforming during the transmit operation and beamsteering during the receive operation, the array is provided with means for variably controlling the relative phases of signals as transmitted and received by the individual antenna elements of the array. With the distributed transmitter arrangement just described the phase command signals during transmit operation may take the form of low level signals directly modulating the transmitter excitation applied to the transmitter unit for each array element.

Charge transfer device matrix multipliers capable of accepting complex inputs and generating complex outputs in the form of Discrete Fourier Transforms (DFT) are employed to generate the necessary set of phasing signals in both the transmit (beamsteering) and receive (beamforming) modes of operation. The output signals from these complex matrix multipliers are analog in character, thus avoiding the need for introduction of roundoff error compensation, and are of form such as to permit, during transmit operation, direct modulation of the drive inputs to the individual transmitters for purposes of beamsteering. If only one of the inputs to the beamsteering matrix multiplier is pulsed on transmit, only a single beam will be radiated; if two or more inputs are pulsed either simultaneously or sequentially a corresponding number of beams will be generated simultaneously or in time sequence. Only a single clock pulse input to the matrix multiplier is required to generate the phase command outputs for all array elements in parallel, so the system scan time between beam positions can be very substantially reduced. Typically, for example, beamswitching can be accomplished in accordance with the invention in something like 300 nanoseconds, as compared to perhaps 5 or 10 microseconds in conventional systems.

During receive operation of the system, signals received at each antenna element are down-converted to baseband and supplied as complex inputs to a second matrix multiplier. Each complex output of the beamforming matrix multiplier then is an independent beam, with all the beams being available simultaneously at the matrix multiplier outputs. In the case of both the transmit and receive matrix multipliers the beam positions generated will be determined by the values of the fixed multiplier coefficients which are designed or programmed into the multipliers, as described in the aforementioned Gasparek and Engeler patents. Since these values are not readily changed in real time with current matrix multiplier designs, systems implemented with such multipliers can not provide a continuous scan capability electronically, but can readily provide step scan capabilities through beamswitching. Thus systems in accordance with the invention may be designed to produce a sufficient number of beams disposed sufficiently closely together to provide essentially continuous coverage, with sequential switching between the beams for step-scanning between the two beam position extremes.

Adaptation to a planar array, which typically would include antenna elements arrayed in orthogonally related rows and columns though other geometrical configurations also are possible, requires the provision of beamsteering and beamforming matrix multipliers as just described for each of the rows and for each of the columns of the array. If the array beams are to phase-steered in both elevation and azimuth, additional circuitry then is provided for cycling the beamsteering and beamforming circuits through the sequence of scanning operations necessary to cover the desired scan volume.

Because the major part of the beamsteering and beamforming signal processing in both the linear and planar array embodiments mentioned may be accomplished by a pair of matrix multipliers for each row and column, even a planar array radar system may be implemented in relatively simpler and lower cost form than generally is feasible with conventional beamsteering and beamforming techniques. The complex matrix multiplier itself may be implemented on a single LSI (Large Scale Integrated) chip, so the entire system lends itself to implementation in relatively more economical form than is typical of array antenna systems generally.

BRIEF DESCRIPTION OF THE DRAWINGS

While the specification concludes with claims particularly pointing out and distinctly claiming the present invention, the foregoing and other features and advantages of the invention can be more readily ascertained from the following detailed description when read in conjunction with the accompanying drawing, in which:

With continued reference to the drawings, wherein like reference numerals have been used throughout to designate like elements, FIG. 1 illustrates phase relationships along a wave front incident on the elements of an antenna array, a linear array of eight elements 11 being shown. Each of the antenna elements is coupled to an elemental transmit/receive module 13 which includes a linear amplifier the RF output of which is controlled in accordance with amplitude weights introduced as at 15 and phase weights introduced as at 17. These phase weights, which determine the direction of the beam or beams formed by the array, are derived as will now be explained.

Figure 1:
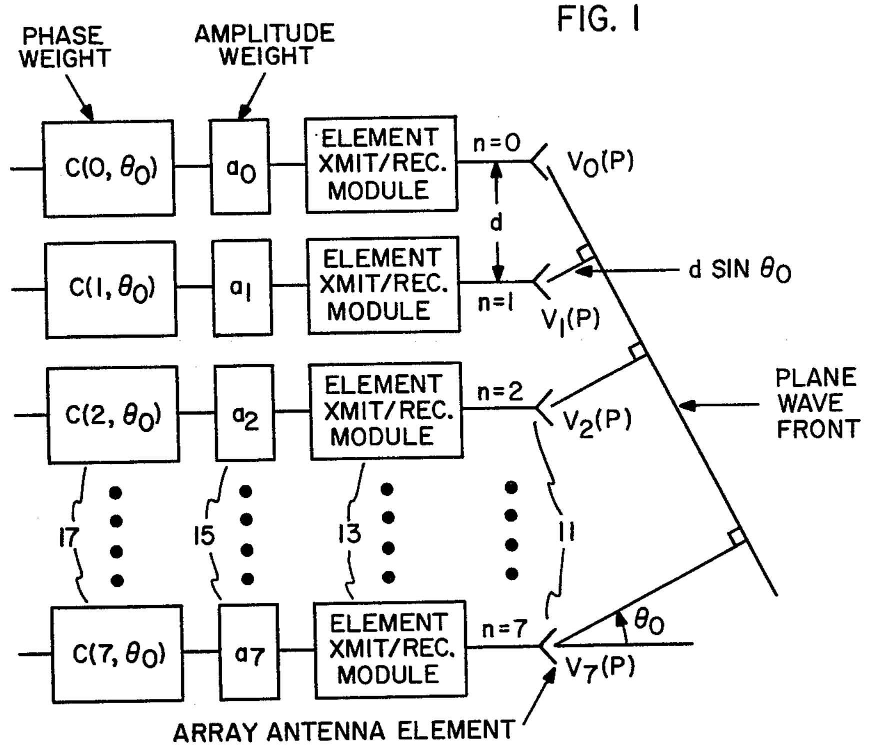
FIG. 1 illustrates generally the phase relationships at points along a linear array of antenna elements.

Incremental element phase shifts ($\Psi$) between adjacent elements for a linear array with scan angle $\theta_o$ are:

$$\Psi=(2\pi/\lambda)\, d \sin \theta_0 \quad (1)$$

where:

$\lambda$=RF wavelength d=inter-element spacing $\theta_0$=scan angle

In an N-element uniformly spaced linear array, phase steering in the direction $\theta_0$, requires multiplying signals in the $n^{th}$ element by the phase weights C (n, $\theta_0$) where:

$$C(n, \theta_0)=e^{-j\Psi n} \quad (2)$$

Substituting for $\Psi$, $$C(n,\theta_o) = e^{-j\frac{2\pi n}{N}\frac{D}{\lambda}\sin\theta_o}\ ;\ n = 0, 1 \ldots N-1 \quad (3)$$

or alternatively, $$C(n,\theta_o) = \cos\left(\frac{2\pi n}{N}\frac{D}{\lambda}\sin\theta_o\right) - j\sin\left(\frac{2\pi n}{N}\frac{D}{\lambda}\sin\theta_o\right) \quad (4)$$

where:

D=length of array, D/N=d

N=number of elements in linear array

A special case of Equation (3) is where $D/\lambda \sin\theta_0$ is an integer k, in which case the resulting beams are equally spaced in $\sin\theta$ space. The phase steering weights for this case are $W^{nk}$, i.e., $$C(n,k)=W^{nk} \quad (5)$$

where:

$$W=e^{-j\,2\pi/N} \quad (6)$$

In the receive mode, the output of the $k^{th}$ beam, $U_k(P)$, at time P, is:

$$U_k(P) = \sum_{n=0}^{N-1} A_n V_n(P)\, W^{nk} \quad (7)$$

where:

$V_n(P)$ is the signal at the $n^{th}$ element at time P $A_n$ is the element amplitude weight Equation (7) is in the form of a Discrete Fourier Transform (DFT) of the signal $V_n$ (p) weighted by $A_n$. Equation (8) illustrates the general form of the DFT of a sequence x(r).

$$Y(l) = \sum_{r=0}^{N-1} x(r)e^{-j\frac{2\pi lr}{N}} = \sum_{r=0}^{N-1} x(r)\, W^{lr} \quad (8)$$

As described in detail in the aforementioned Engeler U.S. Pat. Nos. (4,156,284) and Gasparek (4,161,785), Charge Transfer Device (CTD) matrix multipliers can implement matrix multiplication functions, including such complex multiplication functions as the Discrete Fourier Transform, on a single chip. CTD matrix multipliers perform both their computation and input/output functions on a parallel basis, with the inputs and outputs of the multiplier being sampled analog signals. In accordance with the present invention, CTD matrix multipliers of the type disclosed in the Engeler and Gasparek patents are utilized for both generation of the required phase weights for beamsteering during transmit operation and phase multiplication/summation of the elemental signals for beamforming during receive operation.

When using CTD matrix multipliers, the parameter $D/\lambda \sin \theta$ in Equation (4) does not have to be an integer k, but can take on non-integer values as well. Therefore, beamforming and beamsteering can be adjusted to any angle desired between the two endfire positions, by setting the proper fixed multiplier coefficients into the matrix. Where k is made in integer, the discrete beam positions will be uniformly spaced in $\sin \theta$ space, i.e., they will be at angles at which $\theta_o = k \arcsin D/\lambda$, as previously mentioned.

On transmit, the phase weights are generated by the CTD matrix multiplier for beamsteering. The generation of a single beam is accomplished simply by pulsing the $k^{th}$ real input of the CTD while keeping the remaining inputs grounded as hereinafter explained. From Equation (8), with l=n, and $$x(r) = \delta(r-k) + j0 \text{ (impulse at } k^{th} \text{tap)} \quad (9)$$

the relation:

$$Y(n) = \sum_{r=0}^{N-1} \delta(r-k)\, W^{nr} = W^{nk} \quad (10)$$

yields the desired set of phase weights as given in Equation (5). Thus for each real input pulse there is generated simultaneously the set of complex phase weights needed to radiate a beam in a direction dependent upon the real input pulsed.

Beamsteering phase weights required to shift or step-scan the beam through the entire search volume are generated by sequentially pulsing adjacent real inputs of the CTD matrix multiplier. Alternatively, by pulsing N real inputs simultaneously, there will be generated up to N beams in N directions simultaneously.

Figure 2:
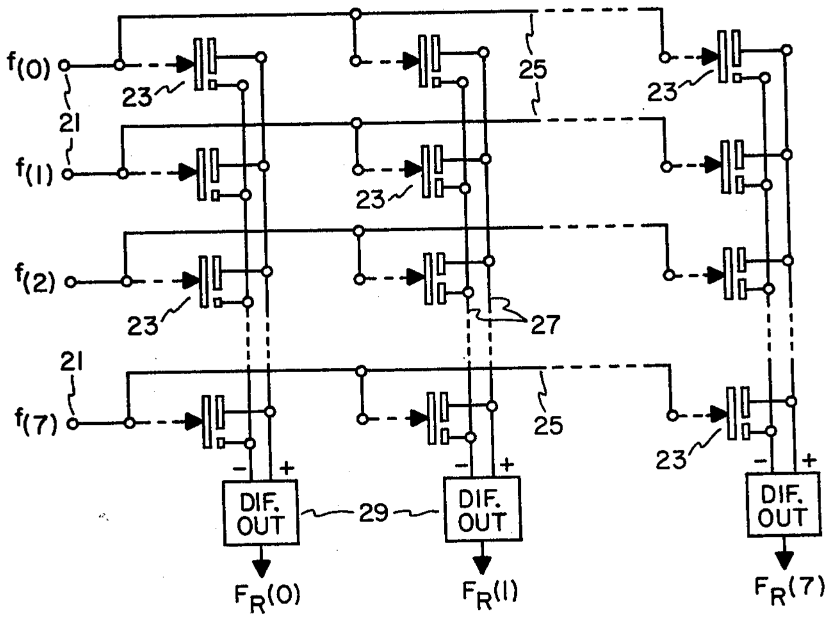
FIG. 2 is a simplified equivalent circuit representation of a complex matrix multiplier suitable for use in the radar system of FIG. 4.

Matrix multipliers suitable for use in radar systems in accordance with the invention are described in detail in the aforementioned patents to Gasparek and Engeler. Summarizing very briefly the description of those patents, and as shown in FIG. 2, such a matrix multiplier comprises a plurality of input terminals 21, an 8×8 array (not all shown) of product elements or cells 23 arranged in orthogonally related rows and columns, a plurality of row interconnections 25 between product elements associated with applying input quantities (i.e., the input vector to each product element), a plurality of double column buses or interconnections 27 between product elements associated with deriving the individual products formed in each product element in performing the matrix multiplication, and a plurality of output circuit means 29 for obtaining the output vector. The product elements 23 may take the form of capacitive storage means with partitioned electrodes providing differential capacities proportioned to yield a fixed coefficient of desired magnitude and sign.

In operation of the matrix multiplier, the analog inputs $f_0$ to $f_7$ are converted to proportional charges $q_0$ to $q_7$, which are distributed to the array of product elements 23 each of which has a charge storage site for accepting the charge and a partitioned storage site for division of the stored charge by a fixed ratio or weights selected in accordance with a corresponding matrix value. Thus, each product element produces an output reflecting the product of the analog input quantity and the stored weight. Products from a column of elements, segregated by sign, are summed on the double column buses 27. The differences in sums, corresponding to each term $F_R(i)$ of the output vector, appear at the outputs of the differential output stages 29. The analog inputs $f_0$ to $f_7$ to the matrix multiplier are clocked into the storage sites at a reasonable rate, typically 3–10 MHz, and the matrix product appears simultaneously upon the parallel output lines of the output stages.

As will be understood, an 8×8 array as shown in FIG. 2 is capable of generating only the real product of the eight inputs to the array and the 64 fixed coefficients stored in the array. For matrix multiplication of complex values, and specifically for generating the Discrete Fourier Transform, complex multiplication is required. This in turn requires, for an eight-point DFT by way of example, a matrix configuration including 16 input and 16 output terminals, and a 16×16 circuit element array totalling 256 elements. The eight real and the eight imaginary input values are applied to the 16 input terminals, and the eight real and eight imaginary output values are obtained from the 16 output terminals.

Figure 3:
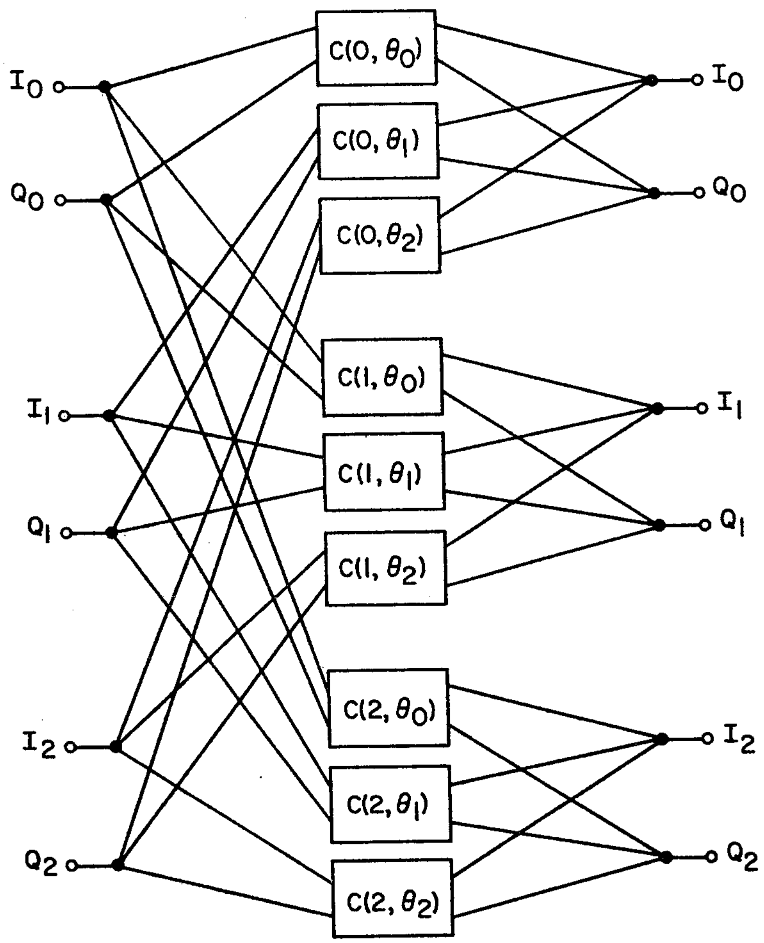
FIG. 3 illustrates diagrammatically and in simplified form the multiplication and summation processes involved in the beamsteering and beamforming matrix multipliers.

The desired set of phase weights is generated in the multiplier matrix in accordance with Equation (10). The process by which this is done is illustrated in FIG. 3, which in the interests of simplification shows only a 3×3 matrix array with real and imaginary inputs $I_0$, $Q_o$, $I_1$, $Q_1$, $I_2$ and $Q_2$ inputs on one side of the array and the corresponding outputs on the other. The phase weights generated through the combination of these real and imaginary input values are as indicated by the various values of $C(n, \theta)$ shown. While signal flow in the matrix multiplier is unidirectional, it is reciprocal in the sense that to direct a beam at any given angle the phase sets are the same for both transmit and receive operation. Thus the multiplication and summation processes illustrated in FIG. 3 are applicable to both the transmit operation, for which the real and imaginary inputs are applied on the left-hand side in FIG. 3 and the outputs taken from the right; and to the receive operation for which signal input would be on the right and output on the left.

Figure 4:
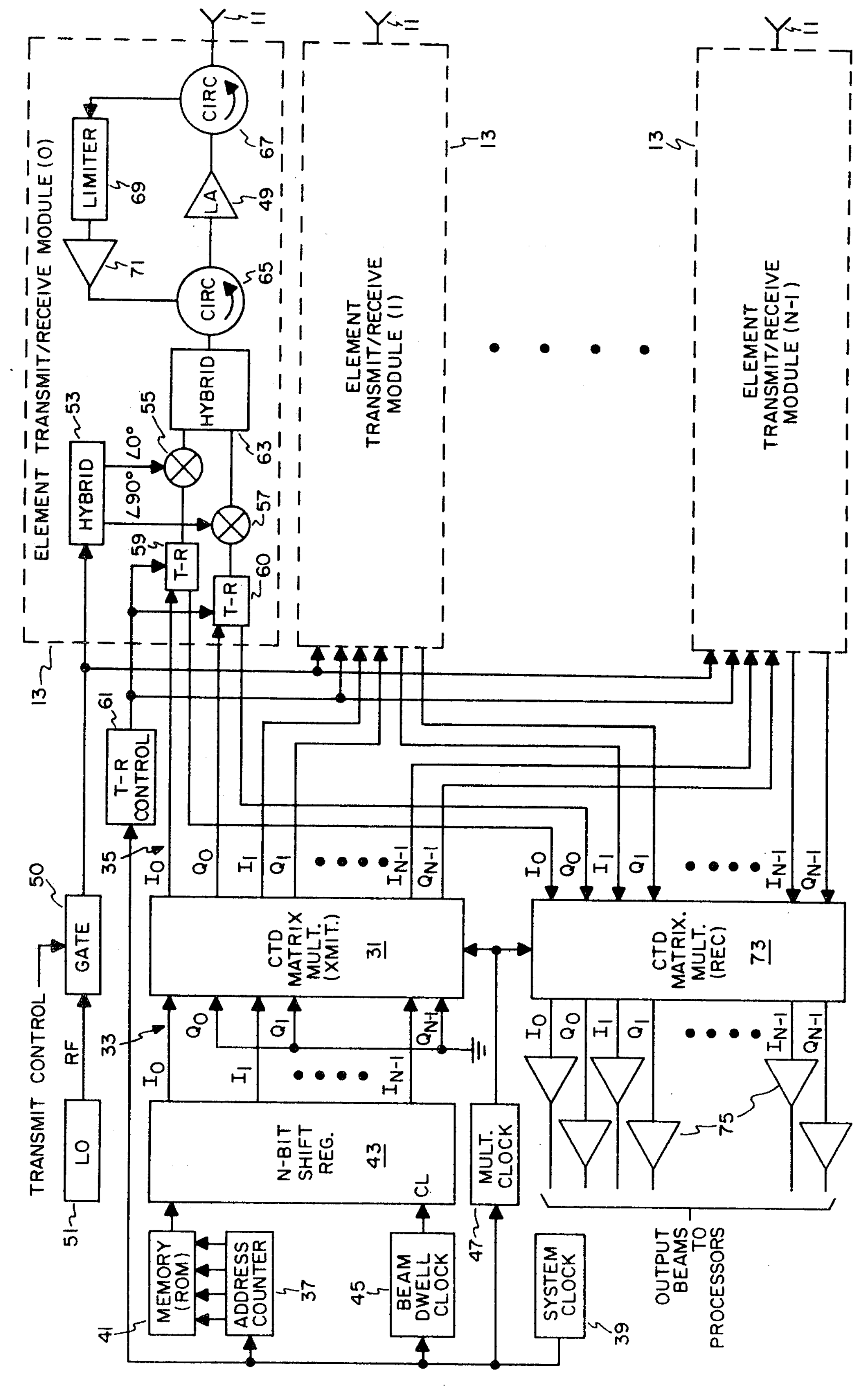
FIG. 4 is a block diagram of a radar system incorporating a phased array antenna with beamsteering and beamforming in accordance with the invention.

Referring now to FIG. 4, there is shown a radar system including means for shifting or step-scanning one or more beams through space. The beams are formed by antenna elements 11 each of which is driven by an associated elemental transmit module 13. These modules provide RF outputs to the antenna elements which are phased relative to each other so as to form and steer one or more beams under control of phasing signals supplied by the complex matrix multiplier 31.

Matrix multiplier 31 includes N complex inputs and N complex outputs as shown at 33 and 35, respectively. For transmit operation the imaginary inputs (Q) of matrix multiplier 31 all are grounded as illustrated. Means are provided for generating and applying input pulses to the real inputs 33 at a pulse rate or frequency of perhaps 3 MHz or so which current matrix multiplier designs can accommodate without difficulty. In the illustrated embodiment such pulse train input means comprises an address counter 37 driven by the system clock 39. The address counter is connected to a one-bit wide read-only memory (ROM) 41 whose output is connected to an N-bit shift register 43. Shift register 43 has its N parallel outputs connected to the N real inputs 33 of matrix multiplier 31. A beam dwell time clock 45 causes the register 43 to switch from input to input of the multiplier 31 at a clock or scan rate which normally is fractionally related to that of the system clock 39.

To sequentially pulse the real inputs of the matrix multiplier, a train of "1"s and "0"s is fed from the ROM into the shift register 43 and applied through it to the first real input of multiplier 31. Then as the shift register responds to each subsequent scan pulse from the beam dwell time clock 45, the real inputs 33 of the matrix multiplier are consecutively pulsed, causing phase weights to be consecutively developed to sequentially scan the single beam thus produced in different directions in space. The phase weights needed to hold the beam in each of its different positions are available so long as the pulse trains to the corresponding real input continue.

As explained in the Gasparek and Engeler patents previously referenced, certain timing or clock input voltages are required to control the operation of matrix multipliers as disclosed in those patents. Such timing inputs are provided in the system of FIG. 4 by the multiplier clock 47, which operates in synchronism with the system clock 39 so as to coordinate the operation of the multiplier with the application to it of input signals from the shift register 43. It might be noted here that since the effect of these multiplier clock inputs is to pulse the multiplier outputs at the clock rate, it is not essential also to pulse the multiplier inputs at 33 in order that the multiplier outputs have the pulse character necessary to the subsequent use of these outputs as the baseband signal inputs to the RF carrier modulators. Hence it is possible to apply dc signals to the multiplier inputs if preferred, and to change these inputs only as changes in beam position are desired.

The transmitter linear amplifier (LA) 49 in each of the elemental transmit/receive modules 13 in FIG. 4 is driven by the RF signal output of a local oscillator (LO) 51 which serves as a common exciter or carrier signal source for the distributed transmitter elements of all the modules. If desired for operation in some modes, as for example with coded pulse transmissions, a gate 50 may be interposed to control the application of the LO signal output to the transmit/receive modules 13. Within each module, the LO input signal is divided through a quadrature or 90° hybrid 53 into in-phase (I) and quadrature (Q) components, and these I and Q signals are applied as inputs to a pair of bi-directional mixers 55 and 57. During transmit operation the other inputs to these mixers are the respective I and Q signals generated by the matrix multiplier 31. These latter signals are applied to the mixers 55–57 through a pair of T-R switches 59 and 60 both of which operate in response to inputs from a T-R control 61 the operation of which may be synchronized to the system clock in conventional manner.

Mixers 55 and 57 function during the transmit operation as modulators, modulating the phase and amplitude of the I and Q signal inputs from LO 51 in accordance with the corresponding signal inputs from matrix multiplier 31 at its operating frequency, which becomes the system baseband frequency. The mixer outputs are connected to an in-phase power combiner/divider 63 which may comprise a conventional bi-directional quadrature hybrid as shown. The results of these modulation and combining operations are such that the phase of the transmitter excitation signal appearing on the combiner output is adjusted, with respect to the phases of the other members of the set of excitation signals produced by the corresponding mixers and combiners comprising the other elemental transmit modules 13, in a manner to produce a phase gradient across the array effective to point the radiated beam or beams in the desired direction. Such formation of a predetermined phase gradient across a set of transmitter excitation signals through the mixing and combining, with the carrier signal, of the real and imaginary components of a modulation signal at baseband frequency, will be explained in greater detail hereinafter.

During transmit operation, the power combiner/divider 63 is coupled through a circulator 65 to provide the excitation or drive signal input to the linear amplifier 49. The output of amplifier 49 is connected through another circulator 67 to the associated antenna element 11. Thus the antenna element driven by each of the elemental transmit/receive modules 13 is excited at a common carrier frequency but with a phase gradient across the array determined by the associated matrix multiplier 31. If desired an amplitude gradient or taper may also be provided for purposes of control of the beam shape and sidelobes, with such taper being introduced either within the matrix multiplier or by adjustment of the relative gains of the individual linear amplifiers or adjustment of the amplitudes of the excitation signals thereto.

As indicated by their nomenclature, the transmit/-receive modules support not only the transmit function but the receive operation as well. On receive, the echo return signals received by each antenna element 11 are coupled through the circulator 67 and a limiter 69 to a receiver preamplifier 71. The output of this preamp is connected through circulator 65 to the in-phase power combiner/divider 63, which is reciprocal in its operation and provides I and Q signal outputs to the respective I and Q modulators/demodulators comprised by mixers 55 and 57. The demodulated I and Q signals are coupled through the T-R switches 59 and 60 to the corresponding I and Q inputs of the output beamformer matrix multiplier which is shown at 73. The N outputs of multiplier 73, each of which defines a beam, are connected through buffer amplifiers 75 to signal processors (not shown).

The operation of the system of FIG. 4 is believed obvious from the foregoing description of the system components and their operation and interconnection. It may be worthwhile, however, to consider here in greater detail the manner in which the modulators 55–57 produce the phase differentials between drive signal outputs of the elemental transmit modules necessary to generate the desired phase gradient along the array.

Referring again to Equation 8, and with x(r) as given in Equation 9, $$Y(K)\Big|_{x(r)=\delta(r-k)+j0} = e^{-\frac{2\pi rk}{N}} = \underbrace{\cos\frac{2\pi rk}{N}}_{\text{(real part)}} - \underbrace{j\sin\frac{2\pi rk}{N}}_{\text{(imaginary part)}} \tag{11}$$

Letting $2\pi rk/N=\phi_k$:

$$Y(K)\Big|_{x(r)=\delta(r-k)+j0} = \underbrace{\cos\phi_k}_{\text{(real)}} - \underbrace{j\sin\phi_k}_{\text{(imaginary)}} \tag{12}$$

Thus there appears on each of the real outputs of the matrix multiplier 31 a value of cos $\phi_k$, and on each of the imaginary outputs a value of $-j\sin\phi_k$, which together define one of the phase weights to be applied to the particular transmitter module to which these outputs are connected.

The cos $\phi_k$ and $-j \sin \phi_k$ signals are applied as inputs to the mixers 55 and 57, respectively, to which the other inputs are the in-phase and quadrature components (cos $\omega_0 t$ and sin $\omega_0 t$) into which the hybrid 53 divides the carrier signal from LO 51. The products of the mixing operation when combined in-phase in hybrid 63 are:

$$Z(t) = \cos(\omega_0 t) \cos \phi_k + \sin(\omega_0 t) \sin \phi_k \quad (13)$$

Using the trigonometric identity $$\cos(x-y) = \cos(x) \cos(y) + \sin(x) \sin(y) \quad (14)$$

Equation 13 becomes:

$$Z(t) = \cos(\omega_0 t - \phi_k) \quad (15)$$

The output of the hybrid 63 in each of the elemental transmit modules thus comprises a common carrier signal with a phase shift $\phi_k$ introduced in each module such that the phase gradient across the array of antenna elements driven by the modules forms and directs the radiated beam at the desired angle. As previously mentioned, by pulsing simultaneously a plurality of the real inputs to the complex matrix multiplier it is possible to generate a like plurality of phase weights for each of the transmitted signals thereby to produce a number of simultaneous beams which may be equally spaced in sin $\theta$ space or not as preferred.

As noted in the discussion of FIG. 3, the complex matrix multipliers as employed in the beamsteering and beam-forming system of FIG. 4 are reciprocal in their operation, not in the sense that they are designed to accommodate bi-directional propagation of signals through them, but in the sense that the same phase weight set which is generated by a matrix multiplier may be used both for transmit beamsteering and receive beamforming, in the case where the desired direction or directions of the transmit and receive beams are the same. In this case it may be possible to further simplify the system by omitting one of the matrix multipliers and multiplexing the transmit beam and receive beam signals through the remaining one.

When separate matrix multipliers are used in the transmit and receive circuits, as in FIG. 4, it is possible to simplify the transmit circuit multiplier by omission from it of its imaginary inputs and the product elements or cells connected thereto. Since those inputs all are grounded (i.e., there input is zero) this omission does not affect the product of the matrix multiplication and summation operation. Such omission of cells with grounded inputs would afford the advantage of avoiding any possible problem of noise introduced through the input connections, but will necessitate some customization of the transmit multiplier LSI circuit and thus could impact its cost.

Generally where matrix multipliers individual to the transmit and receive circuits are used the fixed multiplication coefficients which are set into the two multipliers will be made the same. When this is done the receive beams will be clustered within the volume of illumination of the transmit beam, which in the case of a linear array is of fan configuration. Different multiplication coefficients may be used in the matrix multipliers in certain applications, as for example where the transmit beams are to serve as illuminators for other radars, or some of the receive beamformers are to be used against jammers or targets otherwise illuminated.

The linear array of FIG. 4 comprises only eight antenna elements, which of course is less than would normally be needed for most radar applications. However, the number of elements in the array may be increased as necessary to achieve desired narrowness of beamwidth and power of the radiated beam without undue difficulty of either economic or technical nature. The complex multipliers themselves may be fabricated in LSI (Large Scale Integrated) circuit form, so multiplier matrices containing very large numbers of product elements or cells are feasible and the fact that the required number of such cells increases as the square of the number of antenna array elements presents no insurmountable difficulty. Similarly, most if not all of the components of the elemental transmit/receive modules may be implemented in either LSI or HIC (Hybrid Integrated Circuit) form, to minimize cost and to reduce space and power requirements when integrated into the antenna array structure.

Figure 5:
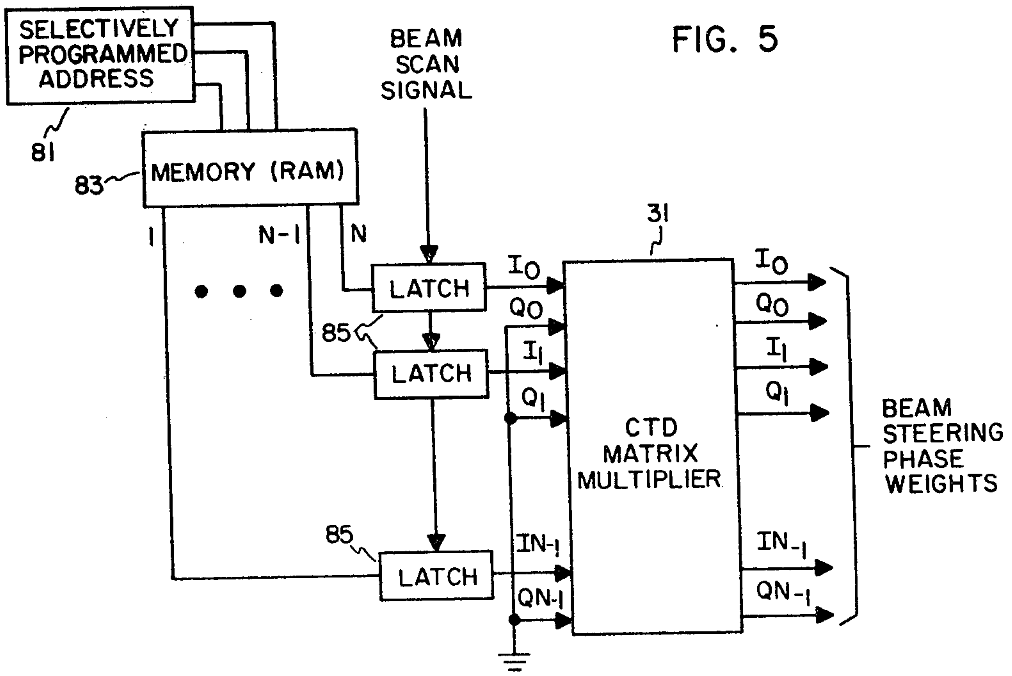
FIG. 5 is a block diagram illustrating beamsteering control circuitry for the radar system FIG. 4, providing a non-sequential or tracking scan of the beams generated thereby.

FIG. 5 shows another means for selectively providing an impulse to the beamsteering matrix multiplier, which in this embodiment comprises a selectively programmed address register or store 81 connected to a random access memory (RAM) 83 with addresses of N bits. Each of the parallel outputs of the RAM 83 is connected through a latch 85 to the N real inputs of the beamsteering matrix multiplier 31. A beam scan signal is connected to all the latches from input terminal 87. The imaginary inputs of the matrix multiplier 31 are grounded as in the embodiment shown in FIG. 4, and the remaining elements of the system may be of the configuration as also shown in that figure.

Using the arrangement in FIG. 5 it is possible to direct beams in any of the available N directions in any order or sequence, as for purposes of tracking. The selectively programmed address register 81, which could be receiving information in real time from a tracking computer, for example, selects a memory location of the random access memory 83 and reads therefrom a beam command containing N bits which are fed in parallel to the N latches 85. When a beam scan strobe signal is received, the contents of the N latches are applied in parallel to the matrix multiplier 31. For each of the real inputs of the multiplier 31 which is thus supplied with a pulse, there are phase weights developed which will direct a beam in one of N directions, depending on which of the real inputs is pulsed. If all the real inputs were pulsed simultaneously phase weights for pointing N beams in N directions simultaneously would be developed. The length of time necessary to re-phase, that is, to go from one or more beams pointing in one or more directions to a different combination of beams pointing in different directions, is orders of magnitude less than with conventional techniques.

Figure 6:
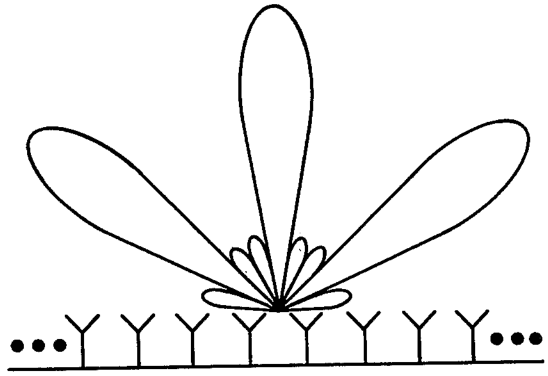
FIG. 6 illustrates the beam pattern for a linear array with three simultaneous beams.

FIG. 6 illustrates by way of example one possible multiple beam configuration which the system of FIG. 5 may be programmed to produce. The radiated beams may be oriented as desired with respect to the plane of the array, as for example with the center beam directed broadside to the array and the two other beams disposed symmetrically on either side of the center beam as shown.

Figure 7:
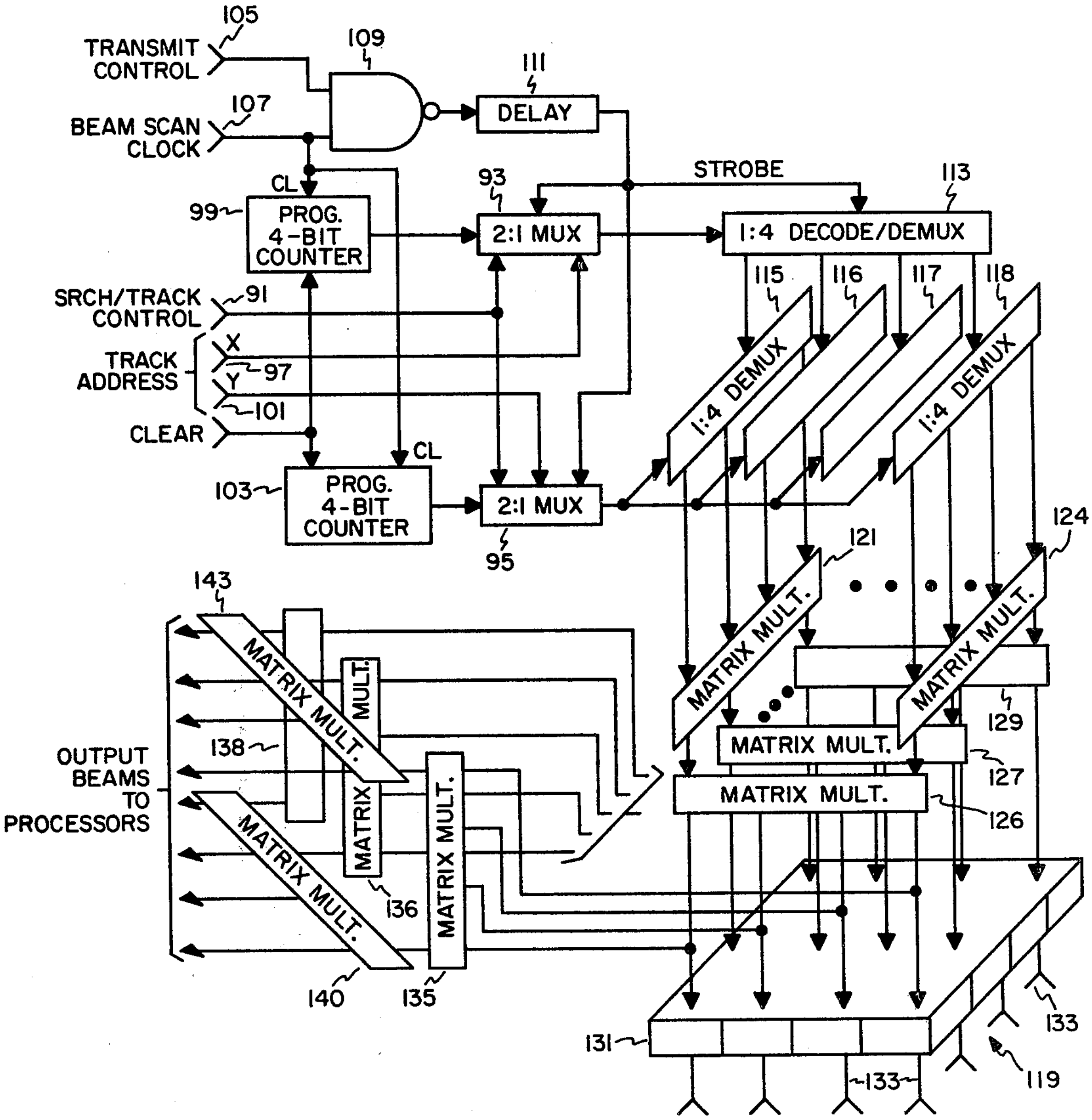
FIG. 7 is a block diagram of a radar system incorporating a planar array with beamsteering and beamforming in accordance with the invention.

Referring now to FIG. 7, a two-dimensional random access impulse response generator for a planar antenna array is shown. A sequential search/track control signal is applied through input terminal 91 to two 2:1 multiplexers 93 and 95. Multiplexer 93 has a first address input, in the form of a coded X address for tracking, through input terminal 97, and a second address input from a sequential beamsteering address generator 99 which in this embodiment takes the form of a programmable 4-bit counter as indicated. Similarly, multiplexer 95 has a coded Y address input through terminal 101 for tracking and a second input from a sequential beamsteering address generator 103 which again takes the form of a programmable 4-bit counter.

Transmit control and beam scan clock signals are supplied through terminals 105 and 107, respectively, to the two inputs to a NAND gate 109. The beam scan clock signal is also connected to the two programmable 4-bit counters 99 and 103. The output of the NAND gate 109 is applied through a time delay module 111 to the strobe input of a 1:4 decoder/demultiplexer 113 and to an "enable" input on each of the multiplexers 92 and 95. Another input to the decoder/demultiplexer 113 is a coded X address from the output of the multiplexer 93.

The decoder/demultiplexer 113 has four outputs each of which is connected to one of the inputs of each of a number of demultiplexers 115–118, the other input of each having applied thereto the coded Y address from multiplexer 95. The number of these demultiplexers 115–118 corresponds to the number of antenna elements in each row of the antenna array, and the number of outputs from each corresponds to the number of elements in each column of the array, which is shown as the 4×4 array designated generally by reference numeral 119 in FIG. 7.

The outputs from the four demultiplexers 115–118 are connected to the real inputs of a first set of four matrix multipliers 121–124 arranged in column formation. The imaginary inputs of these matrix multipliers are grounded for the reasons explained in the discussion of FIG. 4. The complex outputs of the matrix multipliers 121–124 are connected to the real and imaginary inputs of a second set of four matrix multipliers 126–129, arranged in row formation. The interconnection of these multipliers is such that the complex outputs of the first column matrix multiplier provide a complex input for each of the row matrix multipliers, and so on down the columns. The complex outputs of the row multipliers are connected each to one of the elemental transmit/receive modules 131 comprising the module array, with each transmit/receive module connected in turn to one of the antenna elements 133 of the antenna array 119. These antenna elements are arranged as shown in a rectangular grid configuration, though such other configurations as circular and triangular grid arrays also may be employed.

For receive operation, the T-R switches included in the transmit/receive modules 131 connect the demodulated received signal output, at baseband frequency and in complex form, to the real and imaginary inputs of a column set of matrix multipliers 135–138 in generally the same manner as described with reference to the embodiment of FIG. 4. The complex outputs of these column matrix multipliers are connected to the corresponding real and imaginary inputs of a row set of matrix multipliers 140–143 which produce the output beam signals as described with reference to FIG. 4, except that here there are generated sixteen receive beams simultaneously.

The operation of the two-dimensional random access pulse generator of FIG. 7 is as follows. The sequential search/track control signal to multiplexers 93 and 95 determines whether the X address inputs to the decoder/demultiplexer 113 and the Y address inputs to the demultiplexers 115–118 are from the sequential beamsteering address generators, which in this case are the programmable 4-bit counters 99 and 103, or from an external source of track beamsteering addresses applied through input terminals 97 and 101. The beam scan clock input at 107 increments the two programmable counters 99 and 103, and provides an input to the NAND gate 109 to which the transmit control signal is the other input.

When both the clock and the transmit control are at logic level "1", a logic level of "0" is output from the NAND gate. This output is time-delayed by a delay module 111, and applied to decoder/demultiplexer 113 as well as to an "enable" input on multiplexer 93. The delay module 111 assures tht the internal control logic is completed before multiplexer 93 is enabled and the logic level "0" is introduced at decoder/demultiplexer 113. The coded X address then read into the decoder/demultiplexer determines to which row of the following array of demultiplexers 115–118 the logic level "0" is applied. The coded Y address also introduced to this multiplexer array determines to which column the logic level "0" is connected. Depending on the particular row and column addressed, there will be a single "1" logic level output from the multiplexers 115–118 corresponding to that row and column, and the rest of the outputs will be a logic "0".

The outputs of multiplexers 115–110 are connected to the real inputs of the row matrix multipliers 121–124. The complex outputs of the column matrix multipliers are connected to the row matrix multipliers 126–129, and their complex outputs are each connected to one of the array of transmit/receive modules 131, which function as previously described. Each transmit/receive module is connected to an antenna element 133. Since only a single logic level 1 is available at the output of the demultiplexers 115–118 at any given time, only a single beam can be generated at one time with this embodiment.

During receive, the elemental transmit/receive modules are connected to the column beamforming matrix multipliers 135–138 which in turn are connected to the row beamforming matrix multipliers 140–143. The complex outputs of the row beamforming matrix multipliers constitute sixteen different beams all of which are available simultaneously.

The multibeam capability of radars in accordance with the invention may be utilized in a number of different ways. For example, for track-while-scan operation a planar array could be mechanically scanned in azimuth or elevation, or both, while simultaneously tracking a target within a small scan volume by beam-switching between beam positions within the volume. Alternatively, for height finding use a vertically-oriented linear array could be step-scanned through the elevation sector of interest. As yet another alternative, the capability to form and process many individual beams simultaneously offers advantage for use in a multi-target application such as with multiple independent re-entry vehicles.

While this invention has been described with reference to specific embodiments thereof the foregoing will suggest numerous modifications which are possible without departing from the invention. Accordingly, it is desired to cover all such modifications as fall within the spirit and scope of this invention.

I claim:

1. A radar system comprising:

(a) means for generating beamsteering phase weights comprising matrix multiplication means having a first plurality of real and imaginary signal inputs and a second plurality of real and imaginary signal outputs and operable to perform complex multiplication of signals applied to its real and imaginary signal inputs by a matrix of fixed coefficients to provide a plurality of summed product signals at its real and imaginary signal outputs, means for grounding said imaginary signal inputs, and means for selectively applying to at least one of said real signal inputs a sequence of pulses for matrix multiplication thereof such that for each input impulse there is developed a set of complex phase weights one pair of which appears at each pair of the real and imaginary outputs at a baseband frequency;

(b) a source of a radio frequency carrier wave and means for dividing said carrier wave into in-phase and quadrature components;

(c) a plurality of antenna elements disposed in an ordered array for generating one or more electromagnetic wave energy beams in directions determined by the wave energy phase gradient across the elements of the array;

(d) a like plurality of elemental transmitter means each connected to drive one of said antenna elements;

(e) modulator means including a first like plurality of means for modulating the in-phase components of said carrier wave by the baseband phase weights appearing at each of the real signal outputs of said phase weight generating means and a second plurality of means for modulating the quadrature components of said carrier wave by the baseband phase weights appearing at each of the imaginary signal outputs of said phase weight generating means, and (f) means for combining the in-phase and quadrature signals thus modulated by each pair of signals from the real and imaginary signal outputs of the phase weight generating means to derive a set of phased transmitter excitation signals and for applying one thereof to each of said elemental transmitter means to thus produce across the antenna elements driven thereby a phase gradient such as to point the radiated beam in a desired direction.

2. The radar system of claim 1 wherein said means for performing complex matrix multiplication comprises a charge transfer device matrix multiplier.

3. The radar system of claim 1 further comprising a multibeam receive beamformer wherein said beamformer includes a second complex matrix multiplier having paired real and imaginary inputs and outputs and a matrix of fixed multiplication coefficients, and wherein said modulator means demodulates signals received by said antenna elements and provides signals representative of the real and imaginary components of each thereof to one of the pairs of the matrix multiplier inputs to thus produce on each of the matrix multiplier output pairs a complex output signal defining one of a plurality of beams all of which are simultaneously available.

4. The radar system of claim 1 wherein said modulator means demodulates signals received by each of said antenna elements to produce a number of baseband signals representative of the real and imaginary components of the received signals, and wherein the system further includes means for time-multiplexing said received signals at baseband through said matrix multiplication means to form a plurality of receive beams of corresponding number.

5. A radar system comprising:

(a) means for generating beamsteering phase weights comprising matrix multiplication means including a plurality of product elements together operable to perform complex multiplication of one or more real input signals by a matrix of fixed coefficients thereby to produce a plurality of real and imaginary output signals constituting the product of such complex multiplication;

(b) a source of a radio frequency carrier wave and means for dividing said carrier wave into in-phase and quadrature components;

(c) an antenna element array for generating an electromagnetic wave energy beam of direction determined by the phase gradient across the array elements;

(d) a plurality of transmitter means connected to drive said antenna elements;

(e) means for modulating the in-phase components of said carrier wave by each of said real signal outputs of said phase weight generating means and modulating the quadrature components of said carrier wave by each of said imaginary signal outputs of said phase weight generating means, and (f) means for combining pairs of the in-phase and quadrature signals thus modulated to derive a set of phased transmitter excitation signals and applying the same to said transmitter means to produce across the array a phase gradient such as to point the radiated beam in the desired direction.

6. A radar system as defined in claim 5 further including means for selectively applying a plurality of input signals to said means for generating beamsteering phase weights, said input signals being sequentially applied to different of said product elements thereby to produce a corresponding sequence of radiated beams in different directions.

7. A radar system as defined in claim 5 further including means for simultaneously applying a plurality of input signals to a like plurality of the product elements of said means for generating beamsteering phase weights, thereby to produce a corresponding plurality of radiated beams in different directions.

8. A radar system as defined in claim 5 wherein the antenna elements are disposed in plurality of orthogonally related rows and columns, and wherein said matrix multiplication means comprises a matrix multiplier for each of said rows and columns, with one of the complex outputs of each of the row multipliers being connected to one of the complex inputs of each of the column multipliers, and with the complex outputs of the column multipliers being connected to said carrier wave modulating means for producing predetermined phase gradients across the rows and columns of the array.

* * * * *